United States Patent
Revell

(10) Patent No.: US 8,433,066 B2
(45) Date of Patent: Apr. 30, 2013

(54) METHOD FOR GENERATING AN ENCRYPTION/DECRYPTION KEY

(75) Inventor: Elise Revell, Ösmo (SE)

(73) Assignee: Kelisec AB, Ösmo (SE)

( * ) Notice: Subject to any disclaimer, the term of this patent is extended or adjusted under 35 U.S.C. 154(b) by 0 days.

(21) Appl. No.: 13/129,682

(22) PCT Filed: Jul. 5, 2010

(86) PCT No.: PCT/SE2010/050780
§ 371 (c)(1),
(2), (4) Date: Jun. 3, 2011

(87) PCT Pub. No.: WO2011/002412
PCT Pub. Date: Jan. 6, 2011

(65) Prior Publication Data
US 2012/0087495 A1    Apr. 12, 2012

Related U.S. Application Data

(60) Provisional application No. 61/222,949, filed on Jul. 3, 2009.

(30) Foreign Application Priority Data

Jul. 3, 2009   (SE) ...................................... 0900918

(51) Int. Cl.
*G06F 21/00*   (2006.01)
(52) U.S. Cl.
USPC .......................................................... 380/47
(58) Field of Classification Search ..................... 380/47
See application file for complete search history.

(56) References Cited

U.S. PATENT DOCUMENTS

| 7,043,633 | B1 | 5/2006 | Fink et al. |
| 2002/0159598 | A1 | 10/2002 | Rubinstein et al. |
| 2008/0147820 | A1 | 6/2008 | Maeda et al. |

FOREIGN PATENT DOCUMENTS

| GB | 2 447 674 | 9/2008 |
| WO | 97/16902 | 5/1997 |
| WO | 03/009513 | 1/2003 |
| WO | 2006/081306 | 8/2006 |

OTHER PUBLICATIONS

International Search Report issued on Nov. 3, 2010 in International Application No. PCT/SE2010/050780 filed Jul. 5, 2010.

*Primary Examiner* — Brandon Hoffman
*Assistant Examiner* — Anthony Brown
(74) *Attorney, Agent, or Firm* — Drinker Biddle & Reath LLP

(57) ABSTRACT

The present invention relates to a method for generating an encryption/decryption key, and especially for generating a one-time encryption/decryption key used for symmetric encryption, i.e. where the same key is used both for encryption and decryption. In order to start key generation a first node sends a request to a central server for setting up communication with a second node. The central server sends a key generating file both the nodes. Each node generates a different intermediate data set, i.e a first and second data set. The first data set generated by the first node is sent to the second node, which based on this data set generates a third data set which is sent back to the first node. The generating of a first cryptographic key in node is based on bit by bit comparison between the third and the first intermediate data set and the generation of a second cryptographic key is based on bit by bit comparison between the first and the second intermediate data set. The first and second cryptographic key being the same.

15 Claims, 3 Drawing Sheets

| Process file | | M1 | M2 | Mn |
|---|---|---|---|---|

Fig. 2

| A | B | C | D |
|---|---|---|---|
| 1 | 0 | 1 | 0 |

Fig. 3

| D | C | A | A | C | B | D | B |
|---|---|---|---|---|---|---|---|
| 0 | 1 | 1 | 1 | 1 | 0 | 0 | 0 |

Node A

| A | C | A | B | D | B | D | C |
|---|---|---|---|---|---|---|---|
| 1 | 1 | 1 | 0 | 0 | 0 | 0 | 1 |

Node B

Fig. 4

| Value A | 0 | 1 | 1 | 1 | 1 | 0 | 0 | 0 |
|---|---|---|---|---|---|---|---|---|
| Value B | 1 | 1 | 1 | 0 | 0 | 0 | 0 | 1 |
| Match 1 | F | T | T | F | F | T | T | F |
| Value 1 | 0 | 1 | 1 | 0 | 0 | 1 | 1 | 0 |
| Key B | - | 1 | 1 | - | - | 0 | 0 | - |

Fig. 5

| Value A | 0 | 1 | 1 | 1 | 0 | 0 | 0 |
|---|---|---|---|---|---|---|---|
| Value 1 | 0 | 1 | 1 | 0 | 0 | 1 | 0 |
| Key A | - | 1 | 1 | - | - | 0 | 0 | - |

Fig. 6

METHOD FOR GENERATING AN ENCRYPTION/DECRYPTION KEY

CROSS REFERENCE TO RELATED APPLICATIONS

This application is the National Stage of International Application No. PCT/SE2010/050780, filed Jul. 5, 2010, and claims priority under 35 U.S.C. §119 and/or §365 to Swedish Application No. 0900918-4, filed Jul. 3, 2009 and under 35 U.S.C. §119(e) to U.S. Provisional Application No. 61/222,949, filed Jul. 3, 2009.

TECHNICAL FIELD

The present invention relates to a method for generating an encryption/decryption key, and especially for generating a one-time encryption/decryption key used for symmetric encryption, i.e. where the same key is used both for encryption and decryption. The present invention further relates to a computer program comprising code means for performing the method when run on a computer and a computer program product comprising program code means stored on a computer readable medium for performing the method, when said product is run on a computer.

BACKGROUND

In cryptography, a key is a piece of information that determines the functional output of a cryptographic algorithm. Without a key, the algorithm would have no result. In encryption, a key specifies the particular transformation of plaintext into the encrypted text, or vice versa during decryption. Keys are also used in other cryptographic algorithms, such as digital signature schemes and message authentication codes.

It is often said that in designing security systems, it is wise to assume that the details of the cryptographic algorithm are already available to an attacker. This principle is known as Kerckhoffs' principle and thus only the secrecy of the key provides security. This principle is based on the fact that it is difficult to keep the details of a widely-used algorithm secret. A key is often easier to protect, since it often is a small piece of information compared to the encryption algorithm. However, it may also be difficult to keep a key secret and if the attacker obtains the key in some way he or she may recover the original message from the encrypted data.

Encryption algorithms which use the same key for both encryption and decryption are, as mentioned above, known as symmetric key algorithms. There are also asymmetric key algorithms which use a pair of keys, one to encrypt and one to decrypt. These asymmetric key algorithms allow one key to be made public while retaining the private key in only one location. They are designed so that finding out the private key is extremely difficult, even if the corresponding public key is known. A user of public key technology can publish their public key, while keeping their private key secret, allowing anyone to send them an encrypted message.

In order for a key to be "safe" in conjunction with symmetric encryption algorithms a length of 80 bits is generally considered the minimum and 128-bit keys are commonly used and considered very strong. The keys used in public key cryptography have some mathematical structure. For example, public keys used in the RSA system are the product of two prime numbers. Thus public key systems require longer key lengths than symmetric systems for an equivalent level of security. 3072 bits is the suggested key length for systems based on factoring and integer discrete logarithms which aim to have security equivalent to a 128 bit symmetric cipher.

As mentioned above it is possible to generate keys with a high degree of safety, if they are long enough both for keys based on symmetric and asymmetric algorithms. However, there is a problem in key distribution. If, for example two parties want to communicate with each other using symmetric cryptography they first have to decide what key to use and then the safely distribute it from one party to the other. Furthermore, the key has to be kept secret by both parties. The risk that an intruder may find out the key increases with the time the key is in use. Therefore, a key is normally valid only during a limited time, for example six or twelve months. After that time a new key has to be distributed.

Also, the distribution of keys for asymmetric cryptography encryption encounters problems with key distribution when two parties want to communicate with each other. In order to send information in both directions they need to exchange public keys with each other. Also in this case the keys usually have a limited time period during which they are valid. For a party that communicates with many different parties the management of distribution of valid public keys may be annoying. A typical example is that the validity of a key has expired when you need to send some secret information urgently to another party or that you have not exchanged public keys yet.

Another type of cryptography is quantum cryptography, which uses quantum mechanics to guarantee secure communication. It enables two parties to produce a shared random bit string known only to them, which can be used as a key to encrypt and decrypt messages. An important and unique property of quantum cryptography is the ability of the two communicating users to detect the presence of any third party trying to gain knowledge of the key. This is the result of a fundamental aspect of quantum mechanics, i.e. the process of measuring a quantum system will affect the system. Since a third party trying to eavesdrop on the key somehow has to measure it, there will be detectable anomalies. Thus, the security of quantum cryptography relies on the foundations of quantum mechanics, in contrast to traditional public key cryptography which relies on the computational difficulty of certain mathematical functions, and cannot provide any indication of eavesdropping or guarantee of key security.

Quantum cryptography is only used to produce and distribute a key, not to transmit any message data. This key can then be used with any chosen encryption algorithm to encrypt and decrypt a message, which can then be transmitted over a standard communication channel.

Even if key generation with quantum cryptography provides a very safe way to generate and distribute a key it also has a major drawback. The distance over which a quantum key may be distributed is limited to about 100 kilometer, due to the properties of quantum mechanics.

Given the above mentioned problems there is a need for a simple way to generate and distribute a cryptographic key.

SUMMARY OF INVENTION

The problem to be solved by the present invention is to generate a cryptographic key, which does not need to be distributed to the nodes that want to communicate with each other, i.e. where the key is generated by the nodes themselves.

This problem is according to a first aspect solved by a method for generating an encryption/decryption key, which is useable for safe communication between a first node and a second node. The method comprises the steps of:

sending a request from the first node A to a central server for setting up communication with the second node, sending from the central server a first key generating file to the first node and a second key generating file to the second node in response to the request from the first node, processing the first key generating file on the first node and the second key generating file on the second node, generating a first intermediate data set at the first node and a second intermediate data set at the second node, sending the first intermediate data set from the first node to the second node, comparing bits of the first intermediate data set with corresponding bits of the second intermediate data set, creating a new third intermediate data set based on the bit by bit comparison between the first and second intermediate data set by setting a first value if the compared bits are equal and a second value if the compared bits are unequal, sending the third intermediate data set from the second node to the first node, comparing bits of the third intermediate data set with the corresponding bits of the first intermediate data set, generating a first encryption key based on the bit by bit comparison between the third and the first intermediate data set by keeping the value of the bit of the first data set if the corresponding bit of the third intermediate data set is set to the first value and ignoring the bit of the first intermediate data set if the corresponding bit of the third intermediate data set is set to the second value, generating a second encryption key based on the bit by bit comparison between the first and the second intermediate data set by keeping the value of the bit of the second data set if the corresponding bit of the first intermediate data set is equal and ignoring the bit of the second intermediate data set if the compared bits are unequal, said first and second encryption key being the same.

According to a second aspect of the present invention the problem is solved by a method for generating an encryption/decryption key in a first node, which is useable for safe communication between the first node and a second node. The method according to the second aspect comprises the steps of:

sending a request to a central server for setting up safe communication with the second node, receiving a first key generating file from to the central server in response to the request, processing the first key generating file, generating a first intermediate data set, sending the first intermediate data set to the second node, receiving a third intermediate data set from the second node, comparing bits of the third intermediate data set with corresponding bits of the first intermediate data set, generating a first encryption key based on the bit by bit comparison between the third and the first intermediate data set by keeping the value of the bit of the first data set if the corresponding bit of the third intermediate data set is set to a first value and ignoring the bit of the first intermediate data set if the corresponding bit of the third intermediate data set is set to a second value.

According to a third aspect of the present invention the problem is solved by a method for generating an encryption/decryption key in a second node, which is useable for safe communication between a first node and the second node. According to the third aspect the method comprises the steps of:

receiving a second key generating file from a central server in response to a request from the first node to start safe communication between the first node and the second node, processing the second key generating file, generating a second intermediate data set, receiving a first intermediate data set from the first node, comparing bits of the first intermediate data set with corresponding bits of the second intermediate data set, creating a new third intermediate data set based on the bit by bit comparison between the first and second intermediate data set by setting a first value if the compared bits are equal and a second value if the compared bits are unequal, sending the third intermediate data set to the first node, generating a second encryption key based on the bit by bit comparison between the first and the second intermediate data set by keeping the value of the bit of the second data set if the corresponding bit of the first intermediate data set is equal and ignoring the bit of the second intermediate data set if the compared bits are unequal.

According to a preferred embodiment of the present invention the step of sending the first and second key generating file also comprises sending metadata attached to each key generating file, respectively.

In yet another preferred embodiment of the present invention the metadata comprises a constant to be used for the generation of both the first and second encryption key. The metadata may also comprise information about the encryption key length.

In another embodiment the key length may be randomly generated, within a predetermined interval.

According to a fourth aspect of the invention a computer program is provided which comprises code means for performing the steps of the method, when the program is run on a computer.

According to a fifth aspect of the invention a computer program product is provided, which comprises program code means stored on a computer readable medium for performing the steps of the method, when said product is run on a computer.

The great benefit of the present invention is that the key is generated at the nodes that want to communicate with each other and thus there is no need for key distribution.

BRIEF DESCRIPTION OF THE DRAWINGS

The invention is described in the following with reference to the accompanying drawings, in which FIG. 2 is an example of a key generating file sent from the central server to the nodes that want to communicate, FIG. 3 is an example of a constant used for generating the first and second intermediate data set, FIG. 4 is an example of the first intermediate data set at the first node A and the second intermediate data set at the second node B, FIG. 5 is an example of a matching process between the first and second intermediate data set and the generation of a cryptographic key for the second node B, and FIG. 6 is an example of the generation of a cryptographic key for the first node A.

DETAILED DESCRIPTION OF THE INVENTION

Figure 1:
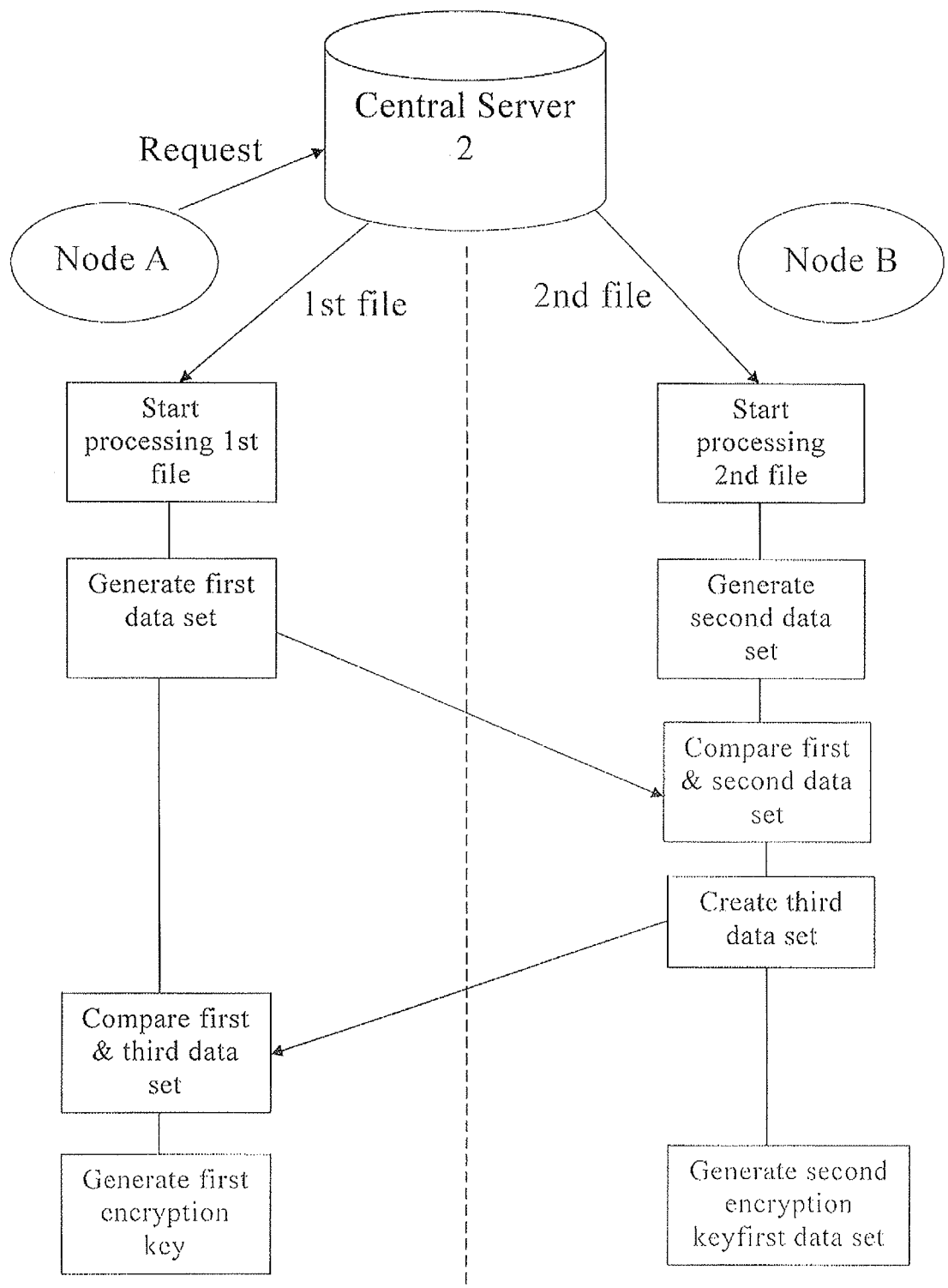
FIG. 1 is a flow chart showing the method for generating a cryptographic key according to the present invention.

The present invention will now be described in detail with help of different embodiments thereof. The embodiments should be seen as examples and explanatory for understanding the invention and not as limiting.

FIG. 1 shows the method for generating a cryptographic key according to the present invention. The overall method is executed by two nodes A and B that want to set up secure communication with each other by using a secure encryption/decryption key. Furthermore, the method is executed with aid of a central server 2. In FIG. 1, the first node A is shown on the left hand side and the second node B on the right hand side, i.e. the steps performed by the first node A are shown on the left hand side of the dashed line and the steps performed by the second node B are shown on the right hand side of the dashed line. In practice the first node A may be a computer, the user of which may want to start secure communication with a computer, the second node B, at his bank. As is evident for a person skilled in the art, both the first node A and the second node B may be any communication devices that want to communicate with each other.

The central server 2 may be any communication device capable of receiving and sending data in a secure way with help of some kind of security certificate. In order for a node to be able to use the key generating method according to the present invention, the node needs to be authorized to communicate with the central server 2. Thus, the central server 2 keeps track of all users that are authorized to use the key generating method. As mentioned above the communication between the central sever 2 and the nodes or vice versa is secure by using some kind of security certificate. Preferably, an X509 certificate or the like is used for secure communication.

The method for generating an encryption/decryption key according to the present invention will now be described by way of an example. The method starts with that a node, in this example the first node A, sends a request to the central server 2 for setting up communication with the second node B. The central server 2 first checks if the first node A is authorized to set up communication with the second node B and also that the second node B is authorized to communicate with the central server 2 and the first node A. If both nodes are authorized to start communication with each other, the central server 2, in response to the request from the first node A, will send a first key generating file to the first node A and a second key generating file to the second node B.

FIG. 2 shows an example of a key generating file that is sent from the central server to the first node A and the second node B. The file contains a process file, which when executed by the first node A and the second node B will generate the encryption/decryption key. Since the processes at the first node A and the second node B are different, which will be explained below, the process file sent to the first node A differs from the process file sent to the second node B. As is evident from FIG. 2, the key generating file also contains metadata M1, M2 ... Mn. The metadata may contain information to be used for generating the encryption/decryption key and the same metadata will be sent both to the first node A and the second node B. Examples of metadata is a constant used to generate the keys. FIG. 3 shows an example of such constant used for generating a first and a second intermediate data set used during key generation. The metadata may also contain a time tag to be used for comparing if both key generating files have the same origin.

Furthermore, the metadata may also contain information about the key length to be used or which bits of the key that should be used for generating the key. As is evident for a person skilled in the art there may be a number of other metadata that may be used in order to further increase the security of the key generating process.

When the key generating file has been received by the first node A and the second node B, each node will start processing the file. Firstly, the first node A will generate a first intermediate data set and the second node B will generate a second intermediate data set by using the value of the constant, as depicted in FIG. 3. The constant contains, in this case, four binary bits each associated with letter. The length of the constant may vary arbitrary and the bits may be associated with letters, figures, greek symbols etc.

An example of the first intermediate data set for the first node A and the second intermediate data set for the second node B is shown in FIG. 4. The intermediate data sets are generated by using some kind of known pseudorandom number generator, using such pseudorandom algorithms as Blum Blum Shub, Fortuna or the Mersenne twister, for generating a random sequence of, in this case, the letters A-D. The random sequence of the letters is shown in the header of the first and second intermediate data set in FIG. 4. Thus, in order to generate the intermediate data set the sequence of the letters is first pseudo randomly determined and thereafter the correct value associated with the letter according to the constant in FIG. 3 will be allotted. If this allotting results in generating for example only zeros or only ones for the intermediate data set this result may be filtered out and a new random sequence is generated.

Since both the first and the second intermediate data set are generated pseudo randomly they will never be the same. The length of the intermediate data sets in this example is only 8 bits in order to readily illustrate the present invention in an example. In practice however, the length of the intermediate data sets is typically between 64 to 2048 bits. The bit length may be part of the metadata as mentioned above and may be set randomly by the central server 2 each time a new request is made from a node.

After the generation of the first and second intermediate data set, the first node will send the first intermediate data set to the second node B without any protection, i.e. publicly.

The second node B will compare the first and second intermediate data set with each other. The result of the comparison is called Match 1 in the table shown in FIG. 5. Value A and value B correspond to the first and second intermediate data set, respectively. The comparison is a bit by bit comparison and the result is True if the value for first and second data set bit, respectively, is equal and False if they are unequal. The result, Match 1, of the comparison is used to create a new third intermediate data set, Value 1, by setting a first value if the compared bits are equal and a second value if the compared bits are unequal. In this case 1 is used when the compared bits are equal and 0 is used if the bits are unequal. However, it could also be the other way around without departing from the present invention.

Figure 6:
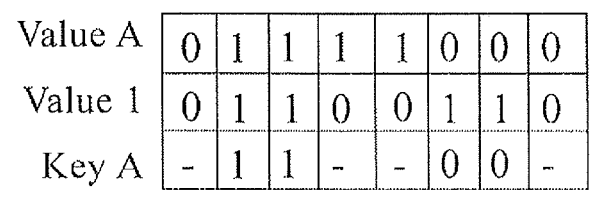

The third intermediate data set is then publicly sent from the second node B to the first node A. The first node A then generates a first cryptographic key based on a bit by bit comparison between the third and the first intermediate data set by keeping the value of the bit of the first data set if the corresponding bit of the third intermediate data set is set to the first value and ignoring the bit of the first intermediate data set if the corresponding bit of the third intermediate data set is set to the second value. In this case the, which is shown in FIG. 6, the first value corresponds to 1 and the second value to 0. As is evident of FIG. 6, the key comprises four bits instead of the original eight bits, since four bits have been ignored during the generation of the key.

As mentioned above both the first intermediate data set and the third intermediate data set is sent publicly. Even if they were intercepted there is no way for a third party to generate a key using this data, since the value of a 1 in the third data set not really means the value 1, but only that the first data set and the second data set have the same value. Thus, a 1 in the third data set may actually be either a 1 or a 0.

In node B the second cryptographic key is generated based on the bit by bit comparison between the first and the second intermediate data set, see FIG. 5, by keeping the value of the bit of the second data set if the corresponding bit of the first intermediate data set is equal and ignoring the bit of the second intermediate data set if the compared bits are unequal. As can be seen said first and second cryptographic key are the same keys. The keys may then be used for encryption/decryption of information sent between the first node A and the second node B. Any known encryption method may be used together with the key generated by method according to the present invention. Thus, the present invention is not directed to how the encryption/decryption is made but towards the generation of cryptographic keys. The generated key will be valid as long as the communication session between the first and second node is active. Furthermore, when the key has been generated by the first node A and the second node B, the key generation files received by the central server will be deleted in respective node.

Now the overall method of the present invention has been described in detail. However the present invention also relates to a method for generating an encryption/decryption key at the first node A. This method is a subset of the overall method described above and will therefore be described briefly. The method executed by the first mode starts out with sending a request to the central server 2 for setting up safe communication with the second node B. The first node then receives the first key generating file from to the central server 2 and stars processing it. This will generate the first intermediate data set, which as mentioned above is sent to the second node B.

The first node A will then receive the third intermediate data set from the second node B and compare the bits of the third intermediate data set with the corresponding bits of the first intermediate data set. The first node A will generate the first encryption key based on the bit by bit comparison between the third and the first intermediate data set by keeping the value of the bit of the first data set if the corresponding bit of the third intermediate data set is set to the first value and ignoring the bit of the first intermediate data set if the corresponding bit of the third intermediate data set is set to the second value.

Also the second node B will execute a subset of the overall method, which now will be described briefly. The method for generating an encryption/decryption key in the second node B starts out with that the second node B receives the second key generating file from the central server 2 and starts processing it. This will generate the second intermediate data set. Thereafter the second node B will receive the first intermediate data set from the first node A and compare bits of the first intermediate data set with corresponding bits of the second intermediate data set. Thereafter the second node B will create a new third intermediate data set based on the bit by bit comparison between the first and second intermediate data set by setting the first value if the compared bits are equal and the second value if the compared bits are unequal. The third intermediate data set is then sent to the first node A.

The second node B then generates the second encryption key based on the bit by bit comparison between the first and the second intermediate data set by keeping the value of the bit of the second data set if the corresponding bit of the first intermediate data set is equal and ignoring the bit of the second intermediate data set if the compared bits are unequal.

Thus, with the method described above it is possible to, in an easy and secure way, generate cryptographic keys where they are used, i.e. at the nodes. This is very beneficial since the need for distributing keys does no longer exist. The key is of the one-time type and will only be valid for one communication session and as long as it is active. Furthermore, the keys are generated in two independent processes at two separate nodes.

Even if it is believed that the above method is very safe the safety may be further improved by making use of the metadata attached to the key generating file. For example the metadata may state that only every third or second bit of the result of the key generation process should be used as a key. A similar use of metadata could also state that only every third or second bit should be read when the first node A and the second node B communicates with each other during the key generating process.

It shall be understood that even if the invention has been described with reference to preferred embodiments the invention is not limited thereto. There are many other embodiments and variations that are likewise within the scope of the invention, which is best defined by the accompanying claims.

The invention claimed is:

1. A method for generating an encryption/decryption key, which is useable for safe communication between a first node and a second node, said method comprising the steps of:
    sending a request from the first node to a central server for setting up communication with the second node,
    sending from the central server a first key generating file to the first node and a second key generating file to the second node in response to the request from the first node,
    start processing the first key generating file on the first node and the second key generating file on the second node,
    generating a first intermediate data set at the first node and a second intermediate data set at the second node,
    sending the first intermediate data set from the first node to the second node,
    comparing bits of the first intermediate data set with corresponding bits of the second intermediate data set,
    creating a new third intermediate data set based on the bit by bit comparison between the first and second intermediate data set by setting a first value if the compared bits are equal and a second value if the compared bits are unequal,
    sending the third intermediate data set from the second node to the first node,
    comparing bits of the third intermediate data set with the corresponding bits of the first intermediate data set,
    generating a first cryptographic key based on the bit by bit comparison between the third and the first intermediate data set by keeping the value of the bit of the first data set if the corresponding bit of the third intermediate data set is set to the first value and ignoring the bit of the first intermediate data set if the corresponding bit of the third intermediate data set is set to the second value,
    generating a second cryptographic key based on the bit by bit comparison between the first and the second intermediate data set by keeping the value of the bit of the second data set if the corresponding bit of the first intermediate data set is equal and ignoring the bit of the second intermediate data set if the compared bits are unequal, said first and second cryptographic key being the same.

2. A method according to claim 1, wherein the step of sending the first key generating file to the first node and the second key generating file to the second node also comprises sending metadata attached to each key generating file, respectively.

3. A method according to claim 2, wherein the metadata comprises a constant to be used for the generation of both the first and second cryptographic key.

4. A method according to claim 2, wherein the metadata comprises information about the cryptographic key length.

5. A method according to claim 4, further comprising the step of, within a predetermined interval, randomly generating the cryptographic key length.

6. A method for generating an encryption/decryption key in a first node which is usable for safe communication between the first node and a second node, said method comprising the steps of:
- sending a request to a central server for setting up safe communication with the second node,
- receiving a first key generating file from to the central server in response to the request,
- processing the first key generating file,
- generating a first intermediate data set,
- sending the first intermediate data set to the second node,
- receiving a third intermediate data set from the second node,
- comparing bits of the third intermediate data set with corresponding bits of the first intermediate data set,
- generating a first cryptographic key based on the bit by bit comparison between the third and the first intermediate data set by keeping the value of the bit of the first data set if the corresponding bit of the third intermediate data set is set to a first value and ignoring the bit of the first intermediate data set if the corresponding bit of the third intermediate data set is set to a second value.

7. A method according to claim 6, wherein the step of receiving the first key generating file also comprises receiving metadata attached to said file.

8. A method according to claim 7, wherein the metadata comprises a constant to be used for the generation of the first cryptographic key.

9. A method according to claim 7, wherein the metadata comprises information about the cryptographic key length.

10. A method for generating an encryption/decryption key in a second node which is useable for safe communication between a first node and the second node, said method comprising the steps of:
- receiving a second key generating file from a central server in response to a request from the first node to start safe communication between the first node and the second node,
- processing the second key generating file,
- generating a second intermediate data set,
- receiving a first intermediate data set from the first node,
- comparing bits of the first intermediate data set with corresponding bits of the second intermediate data set,
- creating a new third intermediate data set based on the bit by bit comparison between the first and second intermediate data set by setting a first value if the compared bits are equal and a second value if the compared bits are unequal,
- sending the third intermediate data set to the first node,
- generating a second cryptographic key based on the bit by bit comparison between the first and the second intermediate data set by keeping the value of the bit of the second data set if the corresponding bit of the first intermediate data set is equal and ignoring the bit of the second intermediate data set if the compared bits are unequal.

11. A method according to claim 10, wherein the step of receiving the second key generating file also comprises receiving metadata attached to said file.

12. A method according to claim 11, wherein the metadata comprises a constant to be used for the generation of the second cryptographic key.

13. A method according to claim 11, wherein the metadata comprises information about the cryptographic key length.

14. A non-transitory computer program comprising code means for performing the steps of claim 1, when the program is run on a computer.

15. A non-transitory computer program product comprising program code means stored on a computer readable medium for performing the method of claim 1, when said product is run on a computer.

* * * * *